United States Patent
Nakamura et al.

(10) Patent No.: US 9,175,180 B2
(45) Date of Patent: *Nov. 3, 2015

(54) INKJET INK AND INKJET IMAGE FORMATION METHOD USING SAME

(75) Inventors: Masaki Nakamura, Hino (JP); Kouki Kawashima, Inagi (JP); Yusuke Takaku, Higashikurume (JP); Takayuki Toeda, Hino (JP)

(73) Assignee: KONICA MINOLTA, INC. (JP)

( * ) Notice: Subject to any disclaimer, the term of this patent is extended or adjusted under 35 U.S.C. 154(b) by 220 days.

This patent is subject to a terminal disclaimer.

(21) Appl. No.: 13/703,437

(22) PCT Filed: May 20, 2011

(86) PCT No.: PCT/JP2011/061630
§ 371 (c)(1),
(2), (4) Date: Dec. 11, 2012

(87) PCT Pub. No.: WO2011/158601
PCT Pub. Date: Dec. 22, 2011

(65) Prior Publication Data
US 2013/0095236 A1  Apr. 18, 2013

(30) Foreign Application Priority Data
Jun. 16, 2010  (JP) ................. 2010-136978

(51) Int. Cl.
*C09D 11/30* (2014.01)
*C09D 11/101* (2014.01)
*C09D 11/324* (2014.01)

(52) U.S. Cl.
CPC .............. *C09D 11/30* (2013.01); *C09D 11/101* (2013.01); *C09D 11/324* (2013.01)

(58) Field of Classification Search
CPC .... C09D 11/30; C09D 11/101; C09D 11/322; C09D 11/324
USPC .......... 522/150, 151, 152, 134, 135, 136, 142, 522/162, 167, 909; 427/457, 466, 487, 508, 427/511, 514
See application file for complete search history.

(56) References Cited

U.S. PATENT DOCUMENTS

| 2008/0299489 A1* | 12/2008 | Byers ..................... 430/286.1 |
| 2009/0286001 A1* | 11/2009 | Kanke et al. ............. 427/487 |
| 2013/0307913 A1* | 11/2013 | Kawashima et al. ...... 347/100 |

FOREIGN PATENT DOCUMENTS

| JP | 11-124403 A | 5/1999 |
| JP | 2000-144033 A | 5/2000 |
| JP | 2007-119449 A | 5/2007 |
| JP | 2008-13772 A | 1/2008 |
| JP | 2008-208216 A | 9/2008 |
| JP | 2009-249572 A | 10/2009 |
| JP | 2010-280751 A | 12/2010 |
| WO | 2006/075654 A1 | 7/2006 |
| WO | WO 2007037521 A1 * | 4/2007 |

* cited by examiner

*Primary Examiner* — Sanza McClendon
(74) *Attorney, Agent, or Firm* — Cantor Colburn LLP

(57) ABSTRACT

Provided is an ultraviolet curable inkjet ink and an inkjet image formation method that uses said inkjet ink. The inkjet ink can be ejected from an inkjet head without being diluted by a solvent, has high photo curing sensitivity and produces high quality images with excellent weather resistance (smear resistance). The inkjet ink is characterized by a polymerizable compound which contains a maleimide compound having a chiral group and a compound selected from a vinyl ether compound and a N-vinyl compound.

7 Claims, No Drawings

INKJET INK AND INKJET IMAGE FORMATION METHOD USING SAME

CROSS REFERENCE TO RELATED APPLICATIONS

This is a U.S. national stage of application No. PCT/JP2011/061630, filed on 20 May 2011. Priority under 35 U.S.C. §119(a) and 35 U.S.C. §365(b) is claimed from Japanese Application No. 2010-136978, filed 16 Jun. 2010, the disclosure of which are also incorporated herein by reference.

FIELD OF THE INVENTION

The present invention relates to a photo curable inkjet ink for an inkjet printer having a photo irradiation apparatus and an inkjet image formation method that uses said inkjet ink.

TECHNICAL BACKGROUND

The inkjet recording method is currently achieving rapid development in various fields, because the high-definition image can be recordable by relatively simple apparatus. The inkjet recording method is applied to various fields and the recording medium or the inkjet inks (hereinafter also simply referred to as an ink) are used just for each purpose. Recently, the recording speed is extremely increasing and the development of printer which has performances applicable for the light printing.

In the inkjet recording method, the image is formed by ejecting an inkjet ink from inkjet head and depositing these droplets on the recording medium. Low viscosity is required for the inkjet ink because droplets of inkjet ink have to be ejected stably from inkjet head. On the contrary, since color mixing phenomena so called bleed tends to occur by depositing plural of inkjet inks having different colors on the recording medium, thereby it is required to use inkjet inks having high viscosity so as to prevent bleed.

As one of the methods to solve this dilemma, an ultraviolet curable inkjet is put to practical use in which a photo curable ink is used. In this image forming method, balance between stable ejection and prevention of bleed is achieved by adding a photo curable monomer and a photo polymerization initiator in an ink and by curing the ink via irradiating light just after depositing on the recording medium. However this method still has other essential problems.

That is, photo-curing conditions are restricted by a polymerization inhibition. Polymerization systems are classified broadly into a radical polymerization and a cationic polymerization. Photo polymerization is inhibited by oxygen in a radical polymerization and by water in the air in a cationic-polymerization system. Therefore, in an inkjet method in which the dots by small droplets are formed by non-contact on a substrate, so as to resolve above inhibition factors, countermeasure is necessary such as using a large-sized ultraviolet irradiation apparatus with high illumination and high intensity for a radical polymerization system, and controlling humidity for a cationic-polymerization system.

Moreover, in case of the light printing use, printed image has to have high weather resistance. Since these inhibitions for curing cause worse weather resistance, an ink which has no curing inhibition and high weather resistance is desired.

As a general method of reducing oxygen inhibition in a radical polymerization, used is a method in which amine such as triethanol amine is added into ink in order to trap oxygen radical. Moreover, recently proposed is a method which uses a monomer having an amino group (for example, Patent documents 1 and 2), but the effect is restrictive.

Also proposed is a method which adopts a polymerization system which is insusceptible to oxygen inhibition. As the polymerization system which is insusceptible to oxygen inhibition, known are an ene-thiol polymerization system (for example, refer to Patent document 3) and a polymerization system using a charge transfer complex in which a monomer having excess electrons such as vinyl ether compound and an electron-poor monomer such as the maleimide compound are used in combination (CT polymerization system (Sonny Jonsson, et. al, Polymer Materials Sci. & Enginer. 1995 and 72, 470-472). However, since an ene-thiol polymerization system has an offensive odor peculiar to thiol, and used maleimide compound has poor solubility, it is not able to use as inkjet ink as it is.

As an attempt to increase a solubility of the maleimide compound used in CT polymerization system, proposed is a maleimide compound which has alkylene oxide in the central part (for example, refer to Patent document 4) or a maleimide compound derived from oleic acid dimer (for example, refer to Patent document 5). However, these compounds have too high molecular weight and viscosity of the ink becomes high, thereby it is difficult to eject this ink stably.

Since there is an attempts to eject an ink of CT polymerization system from an inkjet head by diluting with solvents and lowering viscosity (refer to Patent document 6), it is inadequate as inkjet ink because it cannot be fixed without dryer or it occurs head clogging caused by drying the solvent from head surface.

PRIOR TECHNICAL DOCUMENT

Patent Document

Patent Document 1: Unexamined Japanese Patent Application Publication (hereinafter referred to as JP-A) No. 2009-35650
Patent Document 2: JP-A No. 2008-208216
Patent Document 3: JP-A No. 2009-249572
Patent Document 4: JP-A No. 11-124403
Patent Document 5: JP-A No. 2008-13772
Patent Document 6: WO 06/075654

SUMMARY

Problems to be Solved by the Present Invention

In view of the foregoing, the present invention was achieved. An object of the present invention is to provide an ultraviolet curable inkjet ink and an inkjet image formation method that uses said inkjet ink in which the inkjet ink can be ejected from an inkjet head without being diluted by a solvent, has high photo curing sensitivity and produces high quality images with excellent weather resistance (smear resistance).

Means to Solve the Problems

The above object has been attained by the following constitutions:

1. An ultraviolet curable inkjet ink comprising at least a polymerizable compound, wherein the polymerizable compound contains a maleimide compound having a chiral group and a compound selected from a vinyl ether compound and a N-vinyl compound.

2. The inkjet ink of item 1, wherein the maleimide compound has an asymmertic (chiral) carbon atom located at the first or the second position from a nitrogen atom of the maleimide.

3. The inkjet ink of item 1 or 2, wherein an equivalent ratio of a maleimide group in the maleimide compound to a vinyl group in the vinyl ether compound or the N-vinyl compound is in the range from 70/30 to 20/80.

4. The inlet ink of any one of items 1 to 3, wherein the maleimide compound is represented by Formula (1):

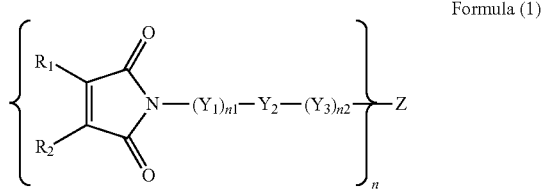

wherein $R_1$ and $R_2$ each represents a hydrogen atom or an alkyl group having carbon number of 1 to 6 and may form a ring, $Y_1$ and $Y_3$ represents a divalent organic linking group with combination of a group selected from alkylene group, alkyleneoxy group, phenylene group, ester group, ether group or thioether group, $Y_2$ represents a divalent group having an asymmertic carbon atom, Z represents a n-th valent linking group, n represents an integer of 1 to 6, n1 represents 0 or 1, and n2 represents 0 or 1.

5. The inkjet ink of any one of items 1 to 4, wherein the maleimide compound and the vinyl ether compound have two polymerizable functional groups in a molecule.

6. The inkjet ink of any one of items 1 to 5, wherein a molecular weight of the maleimide compound is in the range of 200 to 1,000.

7. The inkjet ink of any one of items 1 to 6 comprising a photo initiator.

8. A method for forming inkjet image by utilizing the inkjet ink of any one of items 1 to 7.

Effects of the Invention

The present invention can provide an ultraviolet curable inkjet ink and an inkjet image formation method that uses said inkjet ink in which the inkjet ink can be ejected from an inkjet head without being diluted by a solvent, has high photo curing sensitivity and produces high quality images with excellent weather resistance (smear resistance).

PREFERRED EMBODIMENT OF THE INVENTION

Embodiments of the present invention will now be specifically described with the reference to examples, however the present invention is not limited thereto.

In view of the foregoing, the inventors of the present invention conducted diligent investigations. As a result, the following was discovered, and the present invention was achieved. In the ultraviolet curable inkjet ink comprising at least a polymerizable compound, wherein the polymerizable compound contains a maleimide compound having a chiral group and a compound selected from a vinyl ether compound and a N-vinyl compound, an ultraviolet curable inlet ink and an inkjet image formation method that uses said inkjet ink can be provided in which the inkjet ink can be ejected from an inkjet head, has high photo curing sensitivity and produces high quality images with excellent weather resistance (smear resistance).

By using the maleimide compound having a chiral group, excellent ink ejection can be obtained as a result of reducing the ink viscosity as well as increasing the solubility to the ink Furthermore, when the maleimide compound having a chiral group is used, it was found that photo curing sensitivity becomes high and the weather resistance of the obtained image also improves compared with a case using the maleimide compound without having a chiral group. The reason why photo curing sensitivity becomes high is considered that since a plurality of optical isomers exist in a system, it becomes difficult to crystallize and molecules can freely move and results in increasing reactivity.

The reason of improving the weather resistance is considered that since the resulting polymer chain can be denser than a case of using a maleimide compound without having a chiral group and the polymer chain becomes difficult to be cut off.

An optimal embodiment to practice the present invention will now be detailed, however the present invention is not limited thereto.

<<Maleimide Compound Having Chiral Group>>

The present invention is characterized in that contains a maleimide compound having a chiral group and a compound selected from a vinyl ether compound and a N-vinyl compound.

The maleimide compound having a chiral group concerning the present invention will not be especially limited when it has at least one chiral carbon atom in the molecule, but it is preferable the compound represented by above-mentioned Formula (1) as the maleimide compound.

In the Formula, $R_1$ and $R_2$ each independently represents a hydrogen atom or an alkyl group having carbon number of 1 to 6 and may form a ring. $Y_1$ and $Y_3$ represents a divalent organic linking group with combination of a group selected from alkylene group, alkyleneoxy group, phenylene group, ester group, ether group or thioether group, $Y_2$ represents a divalent group having the asymmertic carbon atom, Z represents a n-th valent linking group, n represents an integer of 1 to 6, n1 represents 0 or 1, and n2 represents 0 or 1.

As an alkyl group represented by $R_1$ and $R_2$, listed are methyl group, ethyl group, propyl group, butyl group, and hexyl group. Moreover, $R_1$ and $R_2$ may join together and may form cyclopropylene ring, cyclobutylene ring, cyclopentene ring, or cyclohexene ring.

Divalent organic linking groups represented by $Y_1$ and $Y_3$ include an alkylene group (for example, such as methylene group, ethylene group, butylene group, and hexylene group), an alkylene oxy group (for example, such as ethylene oxy group, polyethylene oxy group, butylene oxy group, and polybutylene oxy group), an alkylene oxy-carbonyl group (for example, such as ethylene oxy carbonyl group, and hexylene oxy carbonyl group), an alkylene ester group (for example, such as methylene ester group, hexylene ester group, and phenylene group), and a phenyl group (for example, such as methyl phenylene group, oxy carbonyl phenylene carbonyl oxy group, and carbonyl oxy phenylene oxy carbonyl group).

$Y_2$ represents a divalent group which has an asymmetrical carbon (a chiral carbon). It is preferable that the first or the second carbon atom from the nitrogen atom of the maleimide is a chiral carbon.

Specifically, $Y_2$ is represented by the following Formula.

In the Formula, X represents alkyl group having the carbon numbers of 1-18, alkenyl group having the carbon numbers of 1-18, alkyl oxy group having the carbon numbers of 1-18, alkyl carbonyl oxy group having the carbon numbers of 1-18, or a hydroxyl group. Preferably listed are methyl group, ethyl group, propyl group, and isobutyl group which has the carbon numbers of 1-4.

Z represents a n-th valent linking group. In the case of n=1, Z represents hydrogen atom, alkyl group (methyl group, ethyl group, and hexyl group), hydroxyl group, carboxyl group, and alkyl ester group. In the case of n=2, Z is synonymous with the divalent organic linking groups represented by $Y_1$ and $Y_3$. In the case of n=3, Z represents glycerin group, trimethylol alkyl group, and triazine group. In the case of n=4, Z represents pentaerythritol group, and in the case of n=6 Z represents bistrimethylol alkyl group.

In view of ink ejection from the inkjet head, a molecular weight of the maleimide compound having the chiral group is preferably 200-1,000, more preferably 200-800. In the case of 200 or more, it is less subject to crystallize and the head clogging does not occur at the time of the ink ejection. Moreover, in the case of 1,000 or less, the ink viscosity does not become high and the ink can be ejected easily.

Further, still more preferably listed are maleimide compounds represented by the following structural formulas.

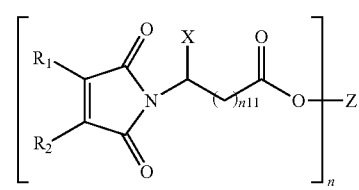

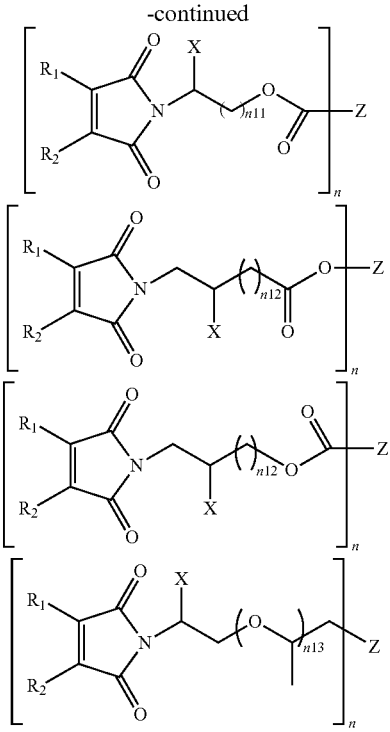

Herein, n11 and n12 each is preferably an integer of 0-6, and n13 is preferably an integer of 1-30. $R_1$, $R_2$, and Z each are synonymous with $R_1$, $R_2$, and Z in Formula (1). X is synonymous with X in the formula described as an example of the divalent group having the asymmetrical carbon (chiral carbon) represented by above-mentioned $Y_2$. Especially preferable are: $R_1$ and $R_2$ each is hydrogen atom and X is alkyl group having the carbon numbers of 1-4, n12 is 0, and Z is alkylene having the carbon numbers of 1-18, or poly oxyalkylene.

The compounds represented by Formula (1) will now be exemplified, however the present invention is not limited thereto.

M-1

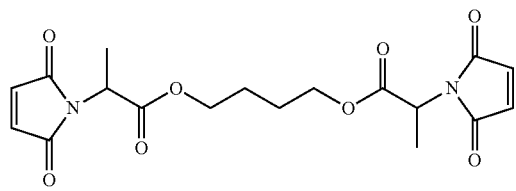

M-2

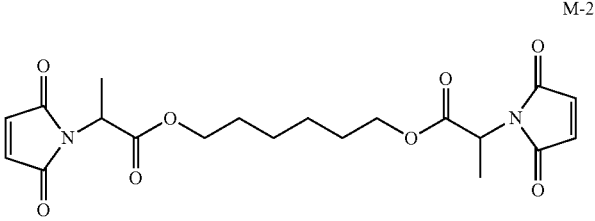

M-3

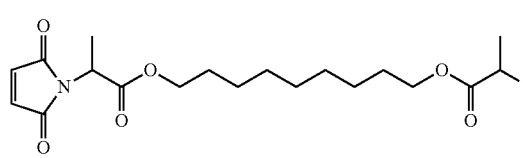

M-4

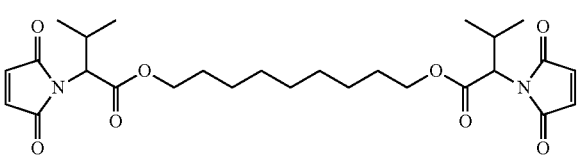

M-5

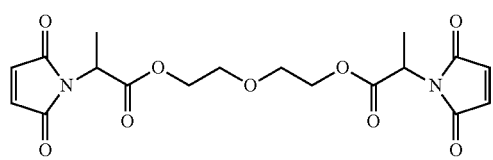

M-6

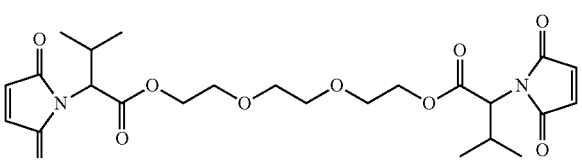

-continued
M-7
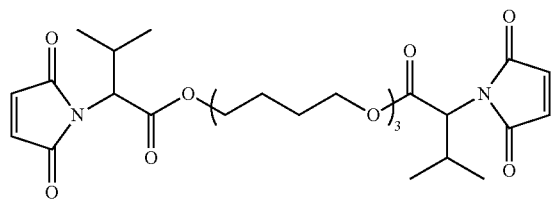
M-8
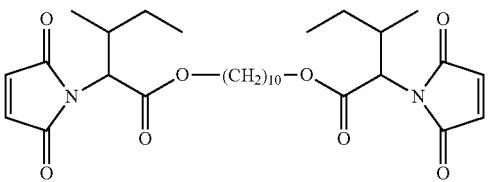
M-9
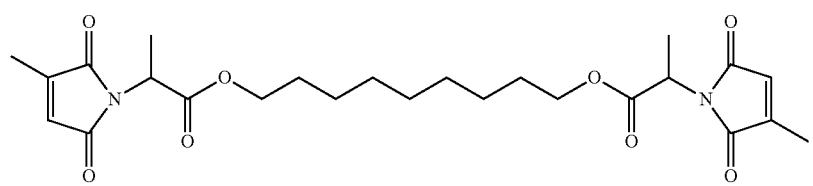
M-10
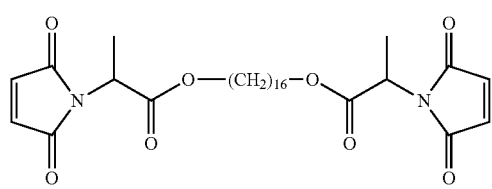
M-11
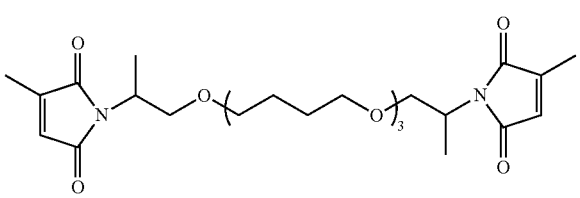
M-12
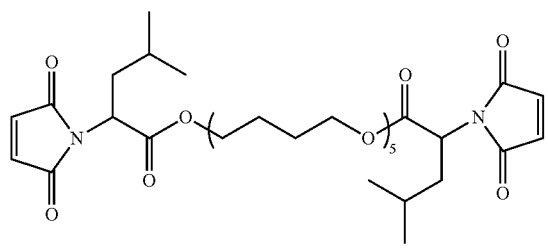
M-13
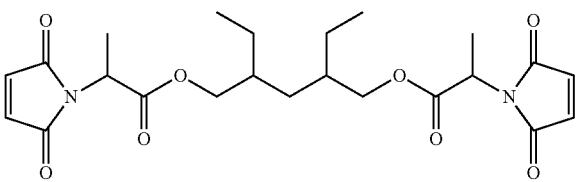
M-14
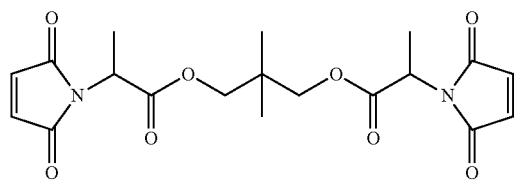
M-15
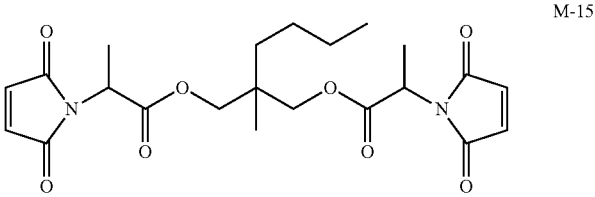
M-16
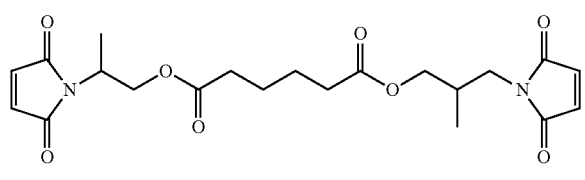
M-17
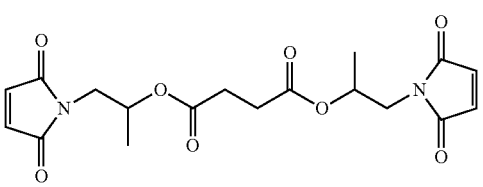
M-18
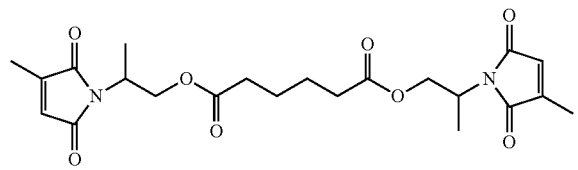
M-19
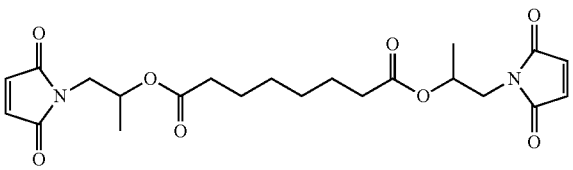

-continued
M-20
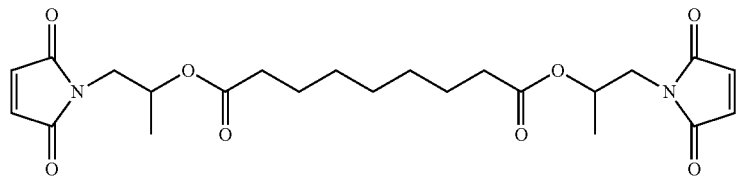
M-21
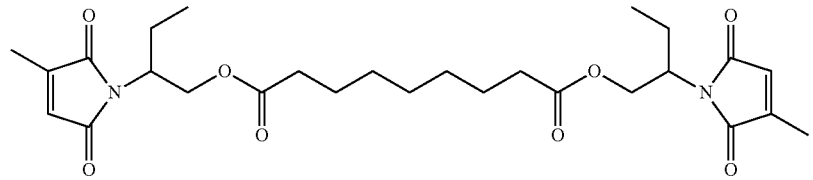
M-22
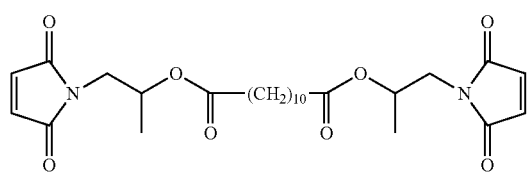
M-23
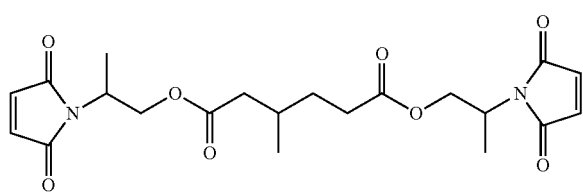
M-24
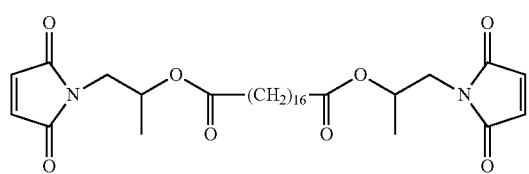
M-25
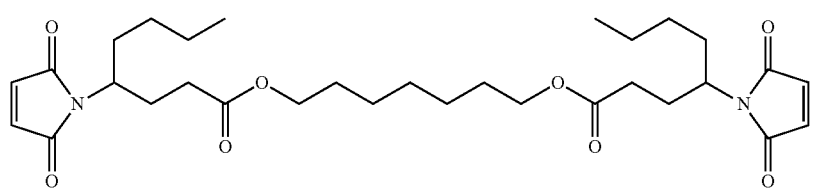
M-26
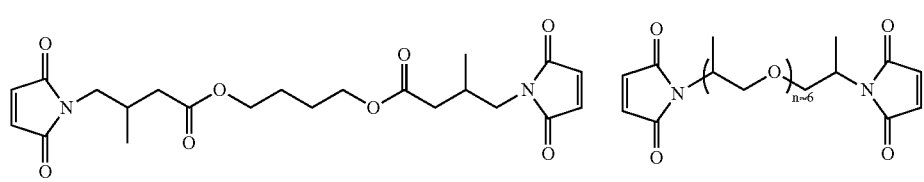
M-27    M-28
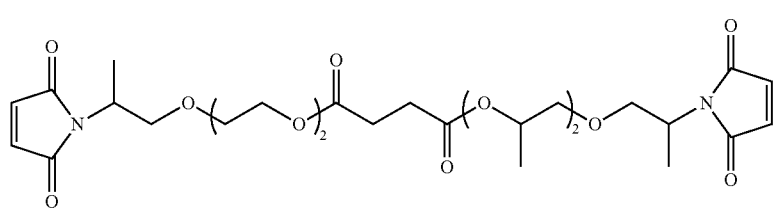
M-29
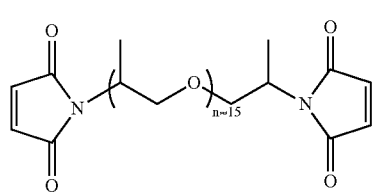
M-30
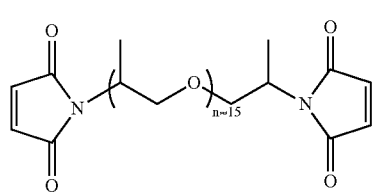
M-31
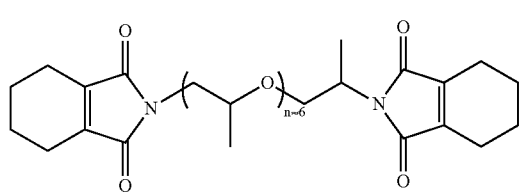

-continued
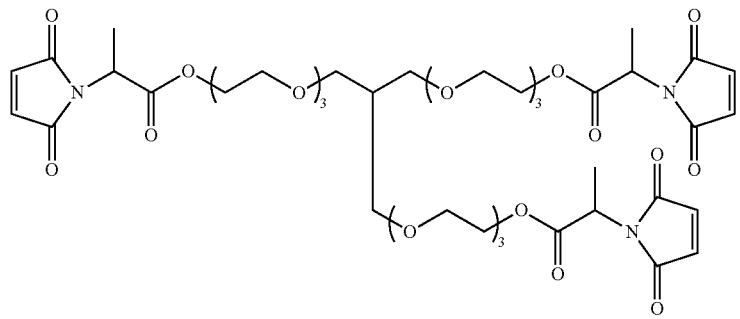
M-32
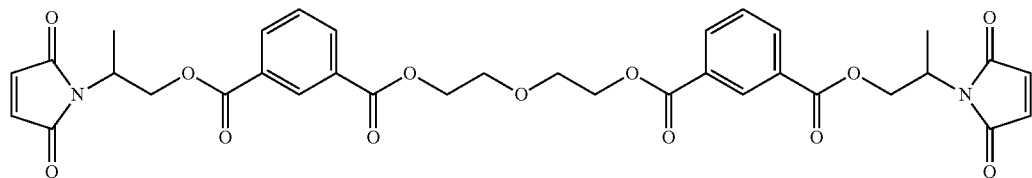
M-33
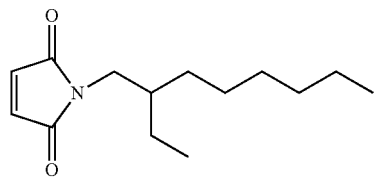
M-34
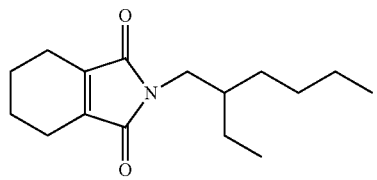
M-35
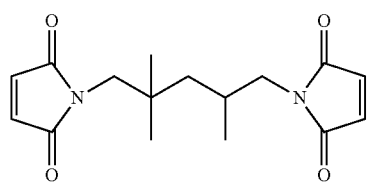
M-36
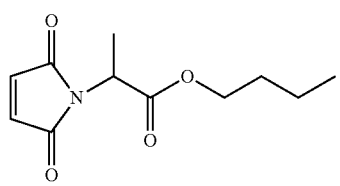
M-37
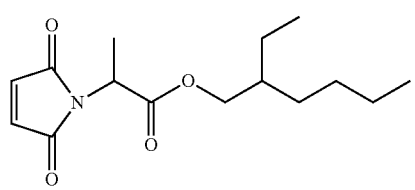
M-38
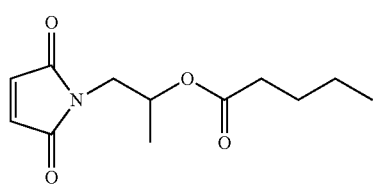
M-39
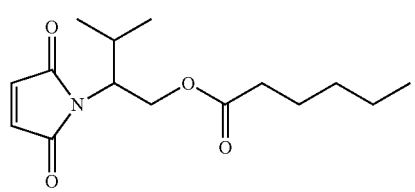
M-40
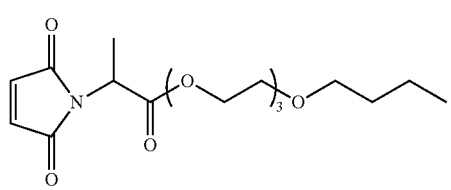
M-41
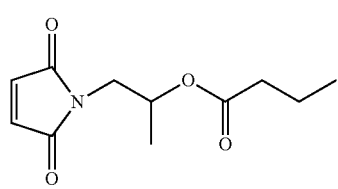
M-42
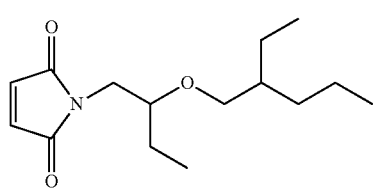
M-43

M-44
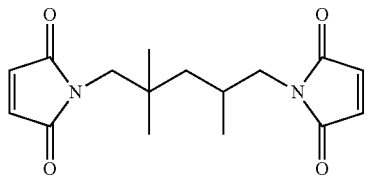

M-45
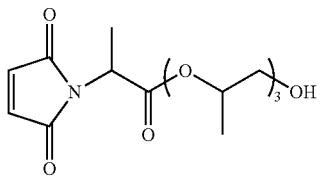

The synthetic process of these maleimide compounds is well-known. For example, it can be easily synthesized according to the method disclosed in Patent document 4 or Macromolecular Chemical and physics, 2009, 210, 269-278.

<<Vinyl Ether Compound>>

The inkjet ink of the present invention is characterized in containing a maleimide compound having a chiral group and a compound selected from a vinyl ether compound and a N-vinyl compound. Specific examples of the vinyl ether compounds used for the present invention are shown below, however the present invention is not limited thereto.

((Mono-Functional) Vinyl Ether Compound Having One Polymerizable Functional Group)

Specific examples of mono-vinyl ether compounds include: n-butyl vinylether, hexyl vinylether, ethylhexyl vinylether, phenyl vinylether, benzyl vinylether, ethylethoxy vinylether, acetylethoxyethoxy vinylether, cyclohexyl vinyl ether, and adamantyl vinylether.

<<Bifunctional Vinyl Ether Compound Having Two Polymerizable Functional Groups>>

Specific examples of bifunctional vinyl ether compound include: ethyleneglycol divinylether, diethyleneglycol divinylether, triethyleneglycol divinylether, propyleneglycol divinylether, dipropyleneglycol divinylether, butyleneglycol divinylether, dibutyleneglycol divinylether, neopentylglycol divinylether, cyclohexandiol divinylether, cyclohexane dimethanol divinylether, norbornyl dimethanol divinylether, isobornyl divinylether, divinyl resorcin, and divinyl hydroquinone.

<<Tri-Functional Vinyl Ether Compound Having Three Polymerizable Functional Groups>>

Specific examples of tri-functional vinyl ether compound include: glycerin trivinylether, glycerin ethyleneoxide adduct trivinylether (added mole of ethyleneoxide: 6), trimethylolpropane trivinylether, and trivinylether ethyleneoxide adduct trivinylether (added mole of ethyleneoxide: 3).

<<Tetra or More Functional Vinyl Ether Compound Having Four or More Polymerizable Functional Groups>>

Specific examples of tetra or more functional vinyl ether compound include: pentaerythritol tetravinylether, ditrimethylolpropane hexavinylether, and oxyethylene adduct thereof.

Among each above-mentioned vinyl ether compound, it is preferable to use a vinyl ether compound having two or more functional groups. When the vinyl ether compound having two or more functional groups is used, the polymerization reaction by an acid occurs promptly and is more preferable in view of photo curing sensitivity.

Specific example of vinylether having alicyclic skeleton include: cyclohexyl vinylether and adamantly vinyl ether in the case of mono-functional group, and cyclopentanedimethaol divinylether, cyclohexanedimethanol divinylether, norbornyldimethanol divinylether and isobornyl divinylether in the case of bifunctional group.

It is preferable to use a bifunctional vinylether compound which has two polymerizable functional groups. When these vinyl ether compounds are used in combination with the maleimide compound of the present invention, the benefits of the present invention can be fully derived.

Vinyl ether compound can be used without limiting the molecular weight in particular, however, it is preferable 100-1,000, more preferable 100-800 in view of keeping a stable ink ejection. In the case of 100 or less, it tends to volatilize easily, resulting in occurring the head clogging caused by the evaporation from an inkjet nozzle. In the case of 800 or more, viscosity will become high and resulting in being difficult of the ink ejection. In the case of molecular weight being 100-1,000, more preferable 100-800, the ink can be ejected preferably.

<<N-Vinyl Compound>>

N-vinyl compound in the present invention means the compound in which the vinyl group is directly bonded to the nitrogen atom. For example, N-vinyl formamide, N-vinyl acetamide, and N-vinyl pyrrolidone are included.

(Composition Ratio of Maleimide Compound to Vinyl Ether Compound, Maleimide Compound to N-Vinyl Compound)

With respect to a composition ratio of maleimide compound to vinyl ether compound, and maleimide compound to N-vinyl compound, since the reaction is carried out via a charge transfer complex, it is theoretically thought to be most cured when the numbers of maleimide group and vinyl ether group or vinyl group of N-vinyl compound are equal, namely, when an equivalent ratio of maleimide group to vinyl ether compound or vinyl group of N-vinyl compound is 50/50. However, since maleimide compound, vinyl ether compound and N-vinyl compound each can also be polymerizable by itself, they are used in the range of 70/30-20/80 by an equivalent ratio. In the case of the equivalent ratio of maleimide compound to vinyl ether compound or N-vinyl compound being in the range of 70/30-20/80, photo curing sensitivity is high. In the case of maleimide compound being 70 equivalent % or less, viscosity does not become high and does not influence to the ink ejection property which is the original purpose of an inkjet. In view of having the optimal ink ejection and photo-curing sensitivity, it is preferable to use the equivalent ratio in the range of 75/25-40/60.

<<Compound Having Other Polymerizable Functional Group>>

In the present invention, maleic acid ester and fumaric acid ester having one polymerizable functional group may be further added in intramolecule.

Moreover, as a monomer which may otherwise be added, maleic acid, fumaric acid, and (meth)acrylic ester are listed.

Specific examples of (meth)acrylic esters include: monofunctional monomer such as isoamyl acrylate, stearyl acrylate, lauryl acrylate, decyl acrylate, isomyristyl acrylate, isostearyl acrylate, 2-ethylhexyl acrylate, 2-hydroxybutyl acrylate, butoxyethyl acrylate, ethoxydiethyleneglycol acrylate, methoxydiethyleneglycol acrylate, methoxypropyleneglycol acrylate, phenoxyethyl acrylate, tetrahydro furfuryl acrylate, isobornyl acrylate, 2-hydroxyethyl acrylate, 2-hydroxypropyl acrylate, 2-hydroxy-3-phenoxypropyl acrylate and t-butylcyclohexyl acrylate; bifunctional monomer such as triethyleneglycol diacrylate, tetraethyleneglycol diacrylate, tripropyleneglycol diacrylate, 1,4-butanediol diacrylate, 1,6-hexanediol diacrylate, 1,9-nonanediol diacrylate, neopentylglycol diacrylate, urethane acrylate, and polyester acrylate; and three or more multi-functional monomer such as trimethylolpropane triacrylate, pentaerythritol triacrylate, pentaerythritol tetraacrylate, and dipentaerythritol hexaacrylate.

[Photo Initiator]

It is preferable to use a photo initiator in the present invention. All the well-known photo initiators which generate radical may be applicable, but the followings are preferably used 1) benzophenones such as benzophenone, hydroxybenzophenone, bis-N,N-dimethylaminobenzophenone, bis-N,N-diethylaminobenzophenone, or 4-methoxy-4'-dimethylaminobenzophenone, and salts thereof;

2) thioxanthones such as 2,4-diethylthioxanthone, isopropylthioxanthone, chlorothioxanthone, or isopropoxychlorothioxanthone;

3) acetophenones;

4) benzoin ethers such as benzoin methyl ether;

5) 2,4,6-trihalomethyltriazines;

6) imidazoles such as 1-hydroxycyclohexylphenyl ketone, 2-(o-chlorophenyl)-4,5-diphenylimidazole dimers, 2-(o-chlorophenyl)-4,5-di(m-methoxyphenyl)imidazole dimers, 2-(o-fluorophenyl)-4,5-phenylimidazole dimers, 2-(o-methoxyphenyl)-4,5-phenylimidazole dimers, 2-(p-methoxyphenyl)-4,5-diphenylimidazole dimers, 2,4-di(p-methoxyphenyl)-5-phenylimidazole dimers, 2-(2,4-dimethoxyphenyl)-4,5-diphenylimidazole dimers, or 2,4,5-triarylimidazole dimers;

7) benzoins such as benzyldimethylketal, 2-benzyl-2-dimethylamino-1-(4-morpholinophenyl)butane-1-one, 2-methyl-1-[4-(methylthio)phenyl]-2-morpholino-1-propanone, 2-hydroxy-2-methyl-1-phenyl-propane-1-one, 1-[4-(2-hydroxyethoxy)-phenyl]-2-hydroxy-2-methyl-1-propane-1-one, phenanthrenequinone, 9,10-phenanthrenequinone, methylbenzoin and ethylbenzoin;

8) bisacylphosphine oxide, bisphenylphosphine oxide, and bis(2,4,6-trimethylbenzoil)-phenylphosphine oxide; and 9) 4-(2-hydroxyethoxy)phenyl-(2-hydroxy-2-propyl)ketone and ethylene oxides thereof.

Further, the above initiators may be added to the ink in the form of a dissolved material or a dispersed material, as appropriate.

<<Sensitizers>>

In the ink of the present invention, a sensitizer can be used for arranging an absorption wavelength to a long wavelength. Specific examples of the photo sensitizer include: thioxanthones(2,4-diethylthioxanthone, isopropyl thioxanthone, chloro thioxanthone, and isopropoxychloro thioxanthone), anthmquinones(ethyl anthraquinone, benzanthraquinone, aminoanthraquinone and chloro anthraquinone), acridines(9-phenyl acridine and 1,7-bis(9,9'-acrydinyl)heptane), styryl ketones, coumarins, rhodamines, cyanines, and merocyanines. Moreover, also dihydrobenzothiaine sensitizer disclosed in JP-A 2010-018728 may be applicable. An addition amount of the photosensitizer is preferably in the range of from 0.1 times to 2 times of the addition amount of the photo initiator.

Moreover, in view of enhancing surface curability, p-dimethylamino ethyl benzoate, p-dimethylamino amyl benzoate, or triethanolamine may be further added.

<<Colorants>>

When the inkjet ink of the present invention is colored, both dyes and pigments are applicable as a colorant. Considering of photo curing, it is preferable to use pigment which has resistance against photo degradation.

As the pigment, carbon black, colorless inorganic pigments such as titanium oxide or calcium carbonate, or colored organic pigments are usable. The organic pigments include insoluble azo pigments such as Toluidino Red, Toluidino Maroon, Hanza Yellow, Benzidine Yellow, or Pyrazolone Red; soluble azo pigments such as Lithol Red, Helio Bordeaux, Pigment Scarlet, or Permanent Red 2B; derivatives from vat dyes such as alizarin, indanthrone, or Thioindigo Maroon; phthalocyanine-based organic pigments such as Phthalocyanine Blue or Phthalocyanine Green; quinacridone-based organic pigments such as Quinacridone Red or Quinacridone Magenta; perylene-based organic pigments such as Perylene Red or Perylene Scarlet; isoindolinone-based organic pigments such as Isoindolinone Yellow or Isoindolinone Orange; pyranthrone-based organic pigments such as Pyranthrone Red or Pyranthrone Orange; thioindigo-based organic pigments; condensed azo-based organic pigments; benzimidazolone-based organic pigments; quinophtharone-based organic pigments such as Quinophthalone Yellow; isoindoline-based organic pigments such as Isoindoline Yellow; and as other pigments, Flavanthrone Yellow, Acylamide Yellow, Nickel Azo Yellow, Copper Azomethine Yellow, Perynone Orange, Anthrone Orange, Dianthraquinonyl Red, and Dioxazine Violet.

Such organic pigments are exemplified with Color Index (C.I.) numbers as follows:

C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185;

C.I. Pigment Orange 16, 36, 43, 51, 55, 59, and 61;

C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240;

C.I. Pigment Violet 19, 23, 29, 30, 37, 40, and 50;

C.I. Pigment Blue 15, 15:1, 15:3, 15:4, 15:6, 22, 60, and 64;

C.I. Pigment Green 7 and 36; and

C.I. Pigment Brown 23, 25, and 26.

Of the above pigments, due to excellent light resistance, preferable are quinacridone based organic pigments, phthalocyanine based organic pigments, benzimidazolone based organic pigments, isoindolinone based organic pigments, condensed azo based organic pigments, quinophtharone based organic pigments, and isoindoline based organic pigments.

An organic pigment is preferably in the form of fine particles, having an average particle diameter of 15-250 nm in an inkjet ink as a determined value via laser scattering. When the average particle diameter of the pigment is less than 15 nm, light resistance decreases due to the decreased particle diameter. In the case of more than 250 nm, coarse particles cause to occur head clogging of inkjet head and also ejection stability decreases, resulting in the problem of occurrence of fine mists referred to as satellites. However, in the case of titanium oxide, to provide whiteness and hiding power, average particle diameter is allowed to be 150-300 nm, preferably 180-250 nm.

Further, coarse particles are preferably eliminated via adequate dispersion or filtration so as for the maximum particle diameter of a pigment in an ink not to exceed 1 μm. The presence of such coarse particles also degrades ejection stability. Organic pigment can be grinded to fine particles by using well-known dispersing methods.

Further, to accelerate adsorption of a pigment dispersant to the surface of the pigment, the pigment is preferably surface-treated via a well-known technology using acid treatment, base treatment, a synergist, or various types of coupling agents, from the viewpoint of ensuring dispersion stability.

To realize adequate density and light resistance, the pigment is preferably contained at 1.5-8% by mass in an inkjet ink in the case of a color except white, and at 1-30% by mass in a white ink employing titanium oxide.

<<Pigment Dispersants>>

As pigment dispersants, listed are a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, stearyl amine acetate, and a pigment derivative.

Specific examples of the dispersants include "Anti-Tena-U (polyaminoamide phosphoric acid salt)," "Anti-Terra-203/204 (high molecular weight polycarboxylic acid salt)," "Disperbyk-101 (polyaminoamide phosphoric acid salt and acid ester), 107 (hydroxyl group-containing carboxylic acid ester), 110 (acid group-containing copolymer), 130 (polyamide), 161, 162, 163, 164, 165, 166, and 170 (copolymer)," "400," "Bykumen (high molecular weight unsaturated acid ester)," "BYK-P104, P105 (high molecular weight unsaturated acid polycarboxylic acid)," "P104S, 240S (high molecular weight unsaturated acid polycarboxylic acid and a silicon-base)," and "Lactimon (long-chain amine, an unsaturated acid polycarboxylic acid, and silicon)" (all produced by BYK Chemie GmbH).

Further, listed are "Elka 44, 46, 47, 48, 49, 54, 63, 64, 65, 66, 71, 701, 764, and 766" and "Elka Polymer 100 (modified polyacrylate), 150 (an aliphatic modified polymer), 400, 401, 402, 403, 450, 451, 452, 453 (modified polyacrylate), and 745 (copper phthalocyanine-base)" (produced by Efka Chemicals Co.); "Flowlen TG-710 (a urethane oligomer)," "Flownon SH-290 and SP-1000," and "Polyflow No. 50E and No. 300 (acrylic copolymer)" (produced by Kyoeisha Chemicals Co., Ltd.); and "Disparlon KS-860, 873SN, and 874 (polymer dispersant), #2150 (aliphatic polycarboxylic acid), and #7004 (polyether ester-type)" (produced by Kusumoto Chemicals, Ltd.).

Still further, listed are "Demol RN, N (naphthalenesulfonic acid formalin condensate sodium salt), MS, C, SN-B (aromatic sulfonic acid formalin condensate sodium salt), and EP," "Homogenol L-18 (polycarboxylic acid-type polymer)," "Emulgen 920, 930, 931, 935, 950, and 985 (polyoxyethylene nonyl phenyl ether)," and "Acetamin 24 (coconut amine acetate) and 86 (stearylamine acetate)" (produced by Kao Corp.); "Solsperse5000 (phthalocyanine ammonium salt-base), 13240, 13940 (polyester amine-base), 17000 (fatty acid amine-base), 24000, 32000, and 7000" (produced by Zeneca Co.); "Nikkol T106 (polyoxyethylene sorbitan monooleate)," "MYS-IEX (polyoxyethylene monostearate)," and "Hexagline 4-0 (hexaglyceryl tetraoleate)" (produced by Nikko Chemicals Co., Ltd.); and "AJISPER 821, 822, and 824" (produced by Ajinomoto Fine-Techno Co., Inc) and Soisperse 24000GR (produced by Lubrizol Corporation).

These pigment dispersants are preferably contained at 5-70% by mass based on 100% by mass of a pigment, more preferably 10-50% by mass. In the case of less than 5%, good dispersion stability cannot be realized. In the case of more than 70% by mass, good ejection stability cannot be maintained.

Further, these pigment dispersants preferably exhibit a solubility of at least 5% by mass at 0° C. with respect to the entire polymerizable compound. In cases where the solubility is less than 5% by mass, when an ink is stored at a low temperature, unfavorable polymer gel or an unfavorable soft aggregate of a pigment is generated, resulting in degradation of ink storage stability and ejection stability.

<<Polymerization Inhibitors>>

A radical polymerization inhibitor is preferably added to the inkjet ink of the present invention in view of achieving storage stability.

As the radical polymerization inhibitor, listed are methoquinone (hydroquinone monomethyl ether), hydroquinone, 4-methoxy-1-naphthol, a hindered amine-based anti-oxidant, a nitrogen-containing heterocyclic mercapto based compound, a thio ether based anti-oxidant, a hindered phenol based anti-oxidant, an ascorbic acid, zinc sulfate, a thiocyanic acid salt, a thiourea derivative, various sugars, a phosphoric acid based anti-oxidant, a nitrous acid salt, a sulfurous acid salt, a thiosulfuric acid salt, a hydroxylamine derivative, nitrosyl radicals, and a polycondensate of a dicyandiamide and a polyalkylenepolyamine. Of these, nitrosyl radicals are specifically preferable.

The added amount of a radical polymerization inhibitor is preferably 10-5,000 ppm. In the case of less than 10 ppm, desired storage stability cannot be realized, and then increased viscosity of the ink and liquid repellency to the inkjet nozzles cannot be realized, resulting in deteriorating ejection stability. Further, in the case of 5,000 ppm or more, photo curing sensitivity decreases.

<<Other Additives>>

In the inkjet ink of the present invention, there can appropriately be used, various additives such as surfactants, lubricants, fillers, anti corrosion agent, antifoaming agents, thickeners, gelling agents, and polymers, if desired.

Further, a small amount of a solvent such as an ester based solvent, an ether based solvent, an ether ester based solvent, a ketone based solvent, an aromatic hydrocarbon solvent, or a nitrogen-containing organic solvent can also be added as appropriate.

<<Ink Physical Properties>>

An inkjet ink ejection property of the present invention largely depends on an ink viscosity. In order to eject the inkjet ink of the present invention stably without head clogging, the ink is preferably allowed to exhibit a viscosity of 5-100 mPa·s at 30° C. The viscosity can be measured by using a Rotatory viscometer.

In addition, it is preferable to have low shear rate dependency, surface tension in the range of 22-35 mN/m at 25° C., and without containing gel-like materials exceeding 1 μm other than pigments.

<<Ink Preparation Method>>

The inkjet ink of the present invention can be produced by sufficiently dispersing a pigment together with a maleimide compound having a chiral group, a vinyl ether compound and a pigment dispersant using a common homogenizer such as a sand mill. It is preferable that a highly concentrated liquid of a pigment is previously prepared, followed by being diluted with an actinic energy radiation curable compound. Dispersion using such a common homogenizer enables to carry out adequate dispersion. Thereby, no excessive amount of dispersion energy is required and excessively long dispersion duration is unnecessary, whereby properties of an ink component tend not to be changed during dispersion and an ink exhibiting excellent stability can be prepared. The thus-prepared ink is preferably filtered with a filter of a pore diameter of 3 μm or less, more preferably 1 μm or less.

<<Inkjet Image Forming Method and Ultraviolet Irradiation Method>>

The inkjet ink of the present invention is applicable to both a serial recording method by multi-pass in which inks are overlap-printed and cured and a line recording method in which inks are recorded in one pass. Specifically, the method comprises steps of applying inkjet inks onto a substrate, irradiating ultraviolet onto the inks on the substrate to be cured or half-cured, further applying inkjet inks thereon and curing the inkjet inks by an actinic energy. Herein, ultraviolet ray means a light having wavelength of 240 nm to 420 nm. Applicable ultraviolet irradiation apparatus include UV LEDs, UV lasers, mercury arc lamps, Xenon arc lamp, low-pressure mercury lamps, fluorescent lamps, carbon arc lamps, tungsten-halogen lamps and sunlight.

<<Substrate>>

As substrate used for the inkjet recording method of the present invention, a wide variety of all the synthetic resins having been used for various end use applications are covered, including, for example, polyester, polyvinyl chloride, polyethylene, polyurethane, polypropylene, (meth)acrylic resins, polycarbonate, polystyrene, acrylonitrile-butadiene-styrene copolymers, polyethylene terephthalate, and polybutadiene terephthalate. The thicknesses and shapes of these synthetic resin substrates are not specifically limited. In addition, metals, glass, and printing paper are also usable.

EXAMPLES

The present invention will now specifically be described with reference to Examples that by no means limit the scope of the present invention. Incidentally, the expression of "part" or "%" referred to in Examples represents "part by mass" or "% by mass" unless otherwise specified.

Example 1

Preparation of Inkjet Ink (Preparation of Inkjet Ink 1-1)

| | |
|---|---|
| TEGDVE (triethyleneglycol divinylether) | 37.3 g |
| Maleimide compound (exemplified compound M-1) | 51.6 g |
| Carbon black | 2.0 g |
| Solsperse 24000GR (produced by Lubrizol Corporation) | 1.0 g |
| TEMPO (2,2,6,6-tetra-methyl piperidinyl-N-oxyl) | 0.1 g |

Above components were mixed and dispersed for 6 hours by a paint shaker with zirconia beads having particle size of 0.5 mm Into the resultant liquid, the following components were mix and dissolved, and Inkjet ink 1-1 was prepared.

| | |
|---|---|
| DAROCURE TPO (phosphine oxide based photo initiator, produced by BASF) | 5.0 g |
| Quantacure ITX (thioxanthone based photosensitizer produced by Aceto Chemical) | 3.0 g |

The equivalent ratio of vinyl ether compound to maleimide compound in the ink is 60/40.

(Preparation of Inkjet Inks 1-2 to 1-23)

Inkjet inks 1-2 to 1-23 were prepared in the same manner as the preparation of Inkjet ink 1-1 except for using vinyl ether compound or N-vinyl compound and maleimide compound listed in Tables 1 and 2 by equivalent ratios 60/40, instead of using TEGDVE and maleimide compound (exemplified compound M-1).

Explanation of the abbreviation in Tables 1 and 2
TEGDVE: Triethyleneglycol divinylether
BuDVE: 1,4-butanediol divinylether
CHDVE: 1,4-cyclohexanedimethanol divinylether

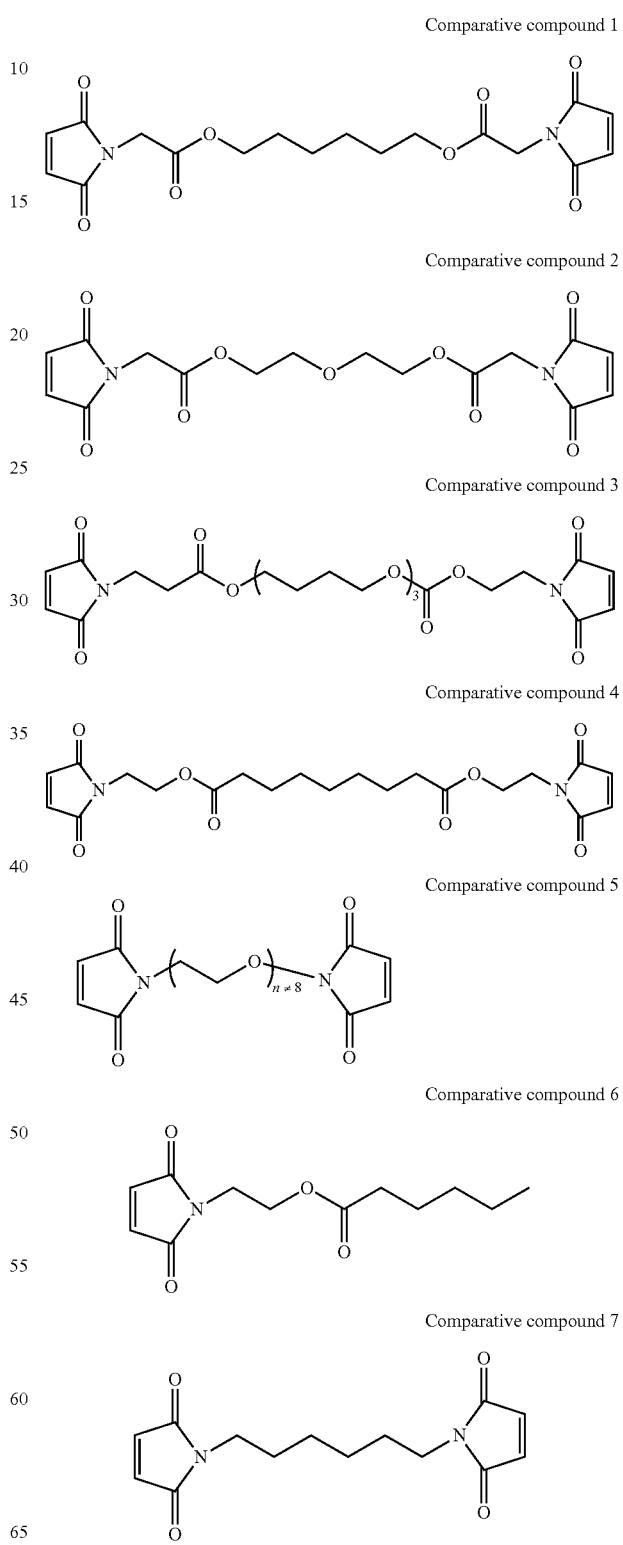

<<Evaluation of the Inkjet Inks>>

Each of the prepared inks was evaluated based on the following methods.

(Evaluation of Ejection Stability)

Using piezo head 512M (produced by Konica Minolta IJ Technologies, Inc.), head temperature was set at 80° C. or less and a temperature where ink viscosity reached to 10 mPa·s, or at 80° C. in the case that the ink viscosity was still higher than 10 mPa·s at 80° C. One L of each ink was continuously ejected for 10 minutes at a droplet size of 12 pl and at a frequency of 12 kHz and then numbers of nozzle ejection failures were detected. Ejection stability was evaluated based on the following criteria.

A: No nozzle ejection failure was observed.
B: The number of nozzle ejection failure was 1 to less than 3% based on the total nozzles.
C: The number of nozzle ejection failure was more than 3% to less than 10% based on the total nozzles.
D: The number of nozzle ejection failure was more than 10% based on the total nozzles.

(Photo Curing Sensitivity)

Serial UV cure type printer having piezo head 512M was put in the ambience at temperature of 25° C. and humidity 50%. A solid image was formed on vinyl chloride film with resolution of 720×720 dpi and UV light was irradiated by arranging a light intensity to 15, 40 and 100 mJ/cm$^2$ via UV-LED "LIGHTING CURE LC-L2" (produced by Hamamatsu Photonics, UV wavelength: 385 nm). The UV irradiated solid image was finger-touched to evaluate the curability based on the following criteria.

A: Image was cured by light intensity of 15 mJ/cm$^2$.
B: Image was not cured by light intensity of 15 mJ/cm$^2$ but cured by 40 mJ/cm$^2$.
C: Image was not cured by light intensity of 40 mJ/cm$^2$ but cured by 100 mJ/cm$^2$.
D: Image was not cured by light intensity of 100 mJ/cm$^2$.

(Evaluation of Weather Resistance)

A solid image on vinyl chloride film instead of polyethylene terephthalate film was prepared in the same manner. Then, using accelerating weather resistance tester QUV (produced by Q-Lab Corp.), a cycle of UV irradiation and humidification/condensation was carried out for 1 month. The cured film was rubbed 5 times by a cotton wetted with alcohol, followed by visual observation of the resulting cured film state. Weather resistance was evaluated based on the following criteria.

A: No change of glossiness was noticed and no ink color was rubbed off to the cotton.
B: Slight change of glossiness was noticed but no ink was rubbed off to the cotton.
C: Slight ink was rubbed off to the cotton.
D: Ink was rubbed off to the cotton, resulting in lowered density Evaluation results are shown in Table 1.

TABLE 1

| Inkjet Ink | Vinyl ether or N-vinyl compound | | Maleimide compound | | Content by mass | | Evaluation | | | |
|---|---|---|---|---|---|---|---|---|---|---|
| | Compound | Equivalent | Compound | Equivalent | Vinyl ether | Maleimide | Ejection | Photo curing sensitivity | Weather resistance | Remarks |
| 1-1 | TEGDVE | 101 | M-1 | 210 | 37.3 | 51.6 | A | A | A | Inv. |
| 1-2 | TEGDVE | 101 | Comp. 1 | 196 | 38.8 | 50.1 | D | C | D | Comp. |
| 1-3 | CHDVE | 98 | M-1 | 210 | 36.6 | 52.3 | A | A | A | Inv. |
| 1-4 | CHDVE | 98 | Comp. 1 | 196 | 38.1 | 50.8 | D | C | C | Comp. |
| 1-5 | BuDVE | 71 | M-5 | 204 | 30.5 | 58.4 | B | B | B | Inv. |
| 1-6 | BuDVE | 71 | Comp. 2 | 190 | 31.9 | 57.0 | D | C | D | Comp. |
| 1-7 | TEGDVE | 101 | M-7 | 332 | 27.9 | 61.0 | B | B | C | Inv. |
| 1-8 | TEGDVE | 101 | Comp. 3 | 312 | 29.1 | 59.8 | D | C | D | Comp. |
| 1-9 | TEGDVE | 101 | M-20 | 231 | 35.2 | 53.7 | A | A | A | Inv. |
| 1-10 | TEGDVE | 101 | M-21 | 259 | 32.8 | 56.1 | A | B | A | Inv. |
| 1-11 | TEGDVE | 101 | Comp. 4 | 217 | 36.5 | 52.4 | D | C | D | Comp. |
| 1-12 | CHDVE | 98 | M-24 | 252 | 32.8 | 56.1 | A | A | A | Inv. |
| 1-13 | TEGDVE | 101 | M-32 | 231 | 35.2 | 53.7 | B | B | A | Inv. |
| 1-14 | CHDVE | 98 | M-28 | 291 | 29.9 | 59.0 | A | B | C | Inv. |
| 1-15 | CHDVE | 98 | M-31 | 345 | 26.6 | 62.3 | B | C | B | Inv. |
| 1-16 | CHDVE | 98 | Comp. 5 | 272 | 31.2 | 57.7 | B | C | D | Comp. |
| 1-17 | TEGDVE | 101 | M-38 | 281 | 31.1 | 57.8 | A | C | C | Inv. |
| 1-18 | TEGDVE | 101 | M-39 | 239 | 34.5 | 54.4 | A | C | C | Inv. |
| 1-19 | TEGDVE | 101 | Comp. 6 | 239 | 34.5 | 54.4 | C | D | D | Comp. |
| 1-20 | TEGDVE | 101 | M-44 | 152 | 44.4 | 44.5 | C | B | C | Inv. |
| 1-21 | TEGDVE | 101 | Comp. 7 | 138 | 46.5 | 42.4 | D | Image cannot be obtained. | Image cannot be obtained. | Comp. |
| I-22 | *1 | 212 | M-1 | 210 | 53.5 | 35.4 | B | C | B | Inv. |
| I-23 | *2 | 111 | M-1 | 210 | 39.2 | 49.7 | C | B | B | Inv. |

*1: Dodecyl vinylether,
*2: N-vinyl pyrrolidone,
Inv. Inventive example,
Comp.: Comparative example The results listed in Table 1 clearly show that any of the inkjet inks of the present invention which contains a maleimide compound having a chiral group and a compound selected from a vinyl ether compound and a N-vinyl compound exhibits excellent ejection stability, high photo curing sensitivity, and weather resistance.

Example 2

Preparation of Inkjet Inks (Preparation of Inkjet Ink 2-1)

| | |
|---|---|
| TEGDVE (triethyleneglycol divinylether) | 72.5 g |
| Maleimide compound (exemplified compound M-1) | 27.5 g |
| Carbon black | 2.0 g |
| Solsperse 24000GR (produced by Lubrizol Corporation) | 1.0 g |
| TEMPO (2,2,6,6-tetra-methyl piperidinyl-N-oxyl) | 0.1 g |

Above components were mixed and dispersed for 6 hours by a paint shaker with zirconia beads having particle size of 0.5 mm Into the resultant liquid, the following components were mix and dissolved, and Inkjet ink 2-1 was prepared.

| | |
|---|---|
| DAROCURE TPO (phosphine oxide based photo initiator, produced by BASF) | 5.0 g |
| Quantacure ITX (thioxanthone based photosensitizer produced by Aceto Chemical) | 3.0 g |

The equivalent ratio of the vinyl ether compound to the maleimide compound of this ink is 85/15.

(Production of Inkjet Inks 2-2 to 2-6)

Inkjet inks 2-2 to 2-6 were prepared in the same manner as the preparation of Inkjet ink 2-1 except for changing equivalent ratios of TEGDVE to maleimide compound listed in Table 3.

(Production of Inkjet Ink 3-1)

| | |
|---|---|
| CHDVE (cyclohexandimethanol divinylether) | 62.6 g |
| Maleimide compound (exemplified compound M-20) | 26.0 g |
| Carbon black | 2.0 g |
| Solsperse 24000GR (produced by Lubrizol Corporation) | 1.0 g |
| TEMPO (2,2,6,6-tetra-methyl piperidinyl-N-oxyl) | 0.1 g |

Above components were mixed and dispersed for 6 hours by a paint shaker with zirconia beads having particle size of 0.5 mm Into the resultant liquid, the following components were mix and dissolved, and Inkjet ink 3-1 was prepared.

| | |
|---|---|
| DAROCURE TPO (phosphine oxide based photo initiator, produced by BASF) | 5.0 g |
| Quantacure ITX (thioxanthone based photosensitizer produced by Aceto Chemical) | 3.0 g |

The equivalent ratio of the vinyl ether compound to the maleimide compound of this ink is 85/15.

(Production of Inkjet Ink 3-2 to 3-6)

Inkjet inks 3-2 to 3-6 were prepared in the same manner as the preparation of Inkjet ink 3-1 except for changing equivalent ratios of CHDVE to maleimide compound listed in Table 4.

<<Evaluation of Inkjet Ink>>

Each of the prepared inks was evaluated in the same manner as Example 1.

The results are shown in Tables 2 and 3.

TABLE 2

| Inkjet Ink No. | | | 2-1 | 2-2 | 2-3 | 2-4 | 2-5 | 2-6 |
|---|---|---|---|---|---|---|---|---|
| Ink composition | TEGDVE | Equivalent ratio | 85 | 80 | 70 | 40 | 30 | 25 |
| | | Mass | 72.5 | 65.0 | 52.0 | 31.7 | 16.6 | 13.4 |
| | Maleimide (M-1) | Equivalent ratio | 15 | 20 | 30 | 60 | 70 | 75 |
| | | Mass | 27.5 | 35.0 | 48.0 | 68.3 | 83.4 | 86.6 |
| | Carbon black | | 2.0 | 2.0 | 2.0 | 2.0 | 2.0 | 2.0 |
| | Polymer dispersant | | 1.0 | 1.0 | 1.0 | 1.0 | 1.0 | 1.0 |
| | TPO | | 5.0 | 5.0 | 5.0 | 5.0 | 5.0 | 5.0 |
| | ITX | | 3.0 | 3.0 | 3.0 | 3.0 | 3.0 | 3.0 |
| | TEMPO | | 0.1 | 0.1 | 0.1 | 0.1 | 0.1 | 0.1 |
| Evaluation | Ejection | | A | A | A | A | B | C |
| | Photo curing sensitivity | | C | B | A | A | B | C |
| | Weather resistance | | C | B | A | A | B | C |

TABLE 3

| Inkjet Ink No. | | | 3-1 | 3-2 | 3-3 | 3-4 | 3-5 | 3-6 |
|---|---|---|---|---|---|---|---|---|
| Ink composition | CHDVE | Equivalent ratio | 85 | 80 | 60 | 40 | 30 | 25 |
| | | Mass | 62.6 | 56.2 | 38.5 | 27.4 | 14.4 | 11.6 |
| | Maleimide (M-20) | Equivalent ratio | 15 | 20 | 40 | 60 | 70 | 75 |
| | | Mass | 26.0 | 33.1 | 60.5 | 96.8 | 78.8 | 81.9 |
| | Carbon black | | 2.0 | 2.0 | 2.0 | 2.0 | 2.0 | 2.0 |
| | Polymer dispersant | | 1.0 | 1.0 | 1.0 | 1.0 | 1.0 | 1.0 |
| | TPO | | 5.0 | 5.0 | 5.0 | 5.0 | 5.0 | 5.0 |
| | ITX | | 3.0 | 3.0 | 3.0 | 3.0 | 3.0 | 3.0 |
| | TEMPO | | 0.1 | 0.1 | 0.1 | 0.1 | 0.1 | 0.1 |
| Evaluation | Ejection | | A | A | A | A | B | C |
| | Photo curing sensitivity | | B | B | A | A | B | C |
| | Weather resistance | | B | B | A | A | B | C |

The results described in Tables 2 and 3 clearly show that inkjet ink according to the present invention comprising a polymerizable compound containing a maleimide compound having a chiral group and a compound of a vinyl ether compound exhibits excellent inkjet ejection, high photo curing sensitivity and weather resistance.

What is claimed is:

1. An ultraviolet curable inkjet ink comprising at least a polymerizable compound, wherein the polymerizable compound contains a maleimide compound having a chiral group and a vinyl ether compound, and wherein the maleimide compound has an asymmetric (chiral) carbon atom located at the first or the second position from a nitrogen atom of the maleimide.

2. The inkjet ink of claim 1, wherein an equivalent ratio of a maleimide group in the maleimide compound to a vinyl group in the vinyl ether compound is in the range from 70/30 to 20/80.

3. The inkjet ink of claim 1, wherein the maleimide compound is represented by Formula (1):

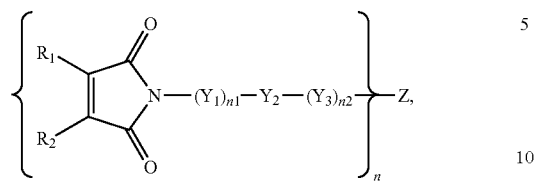

wherein $R_1$ and $R_2$ each represents a hydrogen atom or an alkyl group having carbon number of 1 to 6 and may form a ring, $Y_1$ and $Y_3$ represents a divalent organic linking group with combination of a group selected from alkylene group, alkyleneoxy group, phenylene group, ester group, ether group or thioether group, $Y_2$ represents a divalent group having an asymmetric carbon atom, Z represents a n-th valent linking group, n represents an integer of 1 to 6, n1 represents 0 or 1, and n2 represents 0 or 1.

4. The inkjet ink of claim 1, wherein the maleimide compound and the vinyl ether compound have two polymerizable functional groups in a molecule.

5. The inkjet ink of claim 1, wherein a molecular weight of the maleimide compound is in the range of 200 to 1,000.

6. The inkjet ink of claim 1 comprising a photo initiator.

7. A method for forming inkjet image by utilizing the inkjet ink of claim 1.

* * * * *